No. 678,636. Patented July 16, 1901.
A. BENOÎT, J. GUÉNIFFET & J. NICAULT.
MACHINE FOR MAKING PASTED TUBES FOR CIGARETTES.
(Application filed Jan. 14, 1901.)
(No Model.) 7 Sheets—Sheet 3.

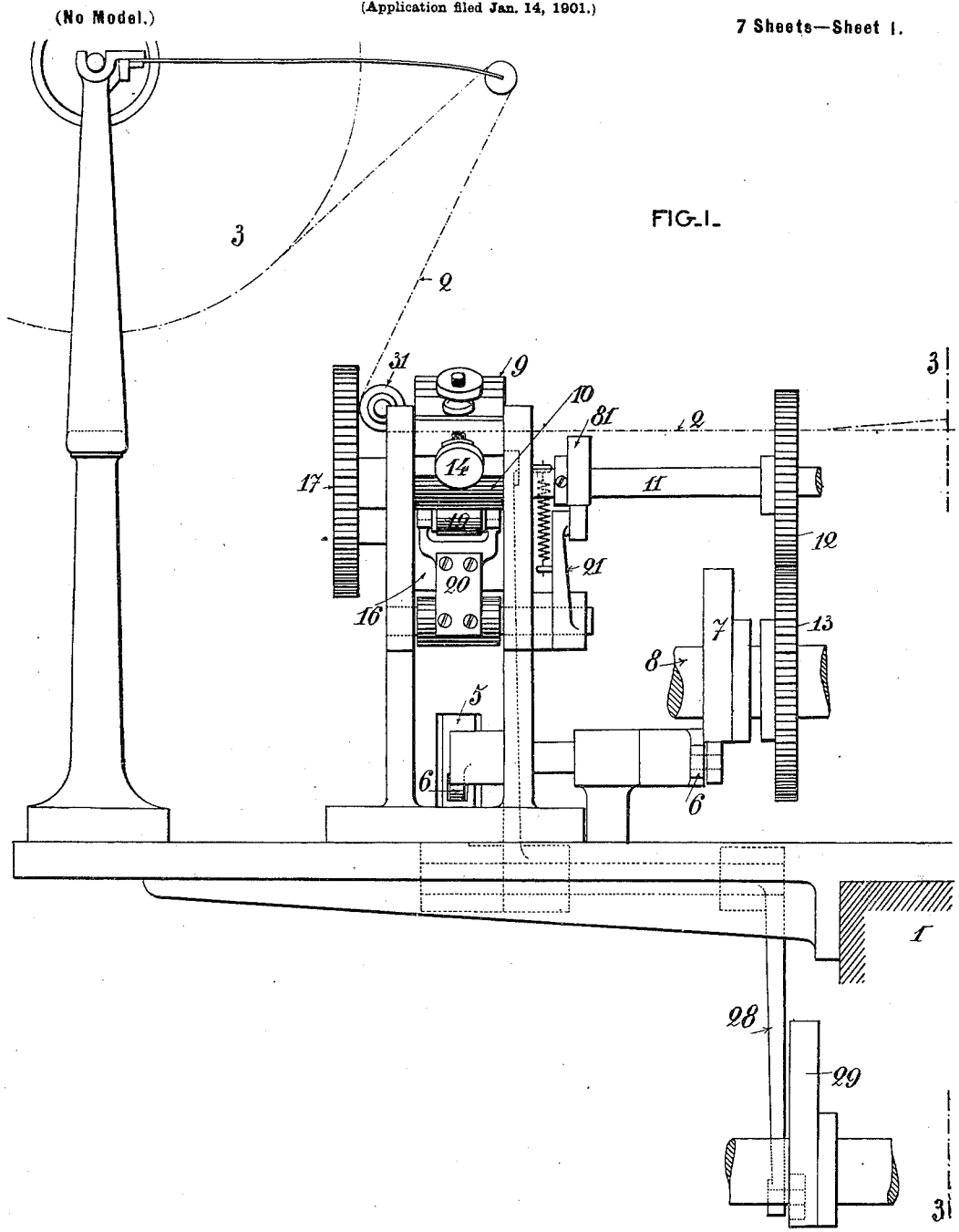

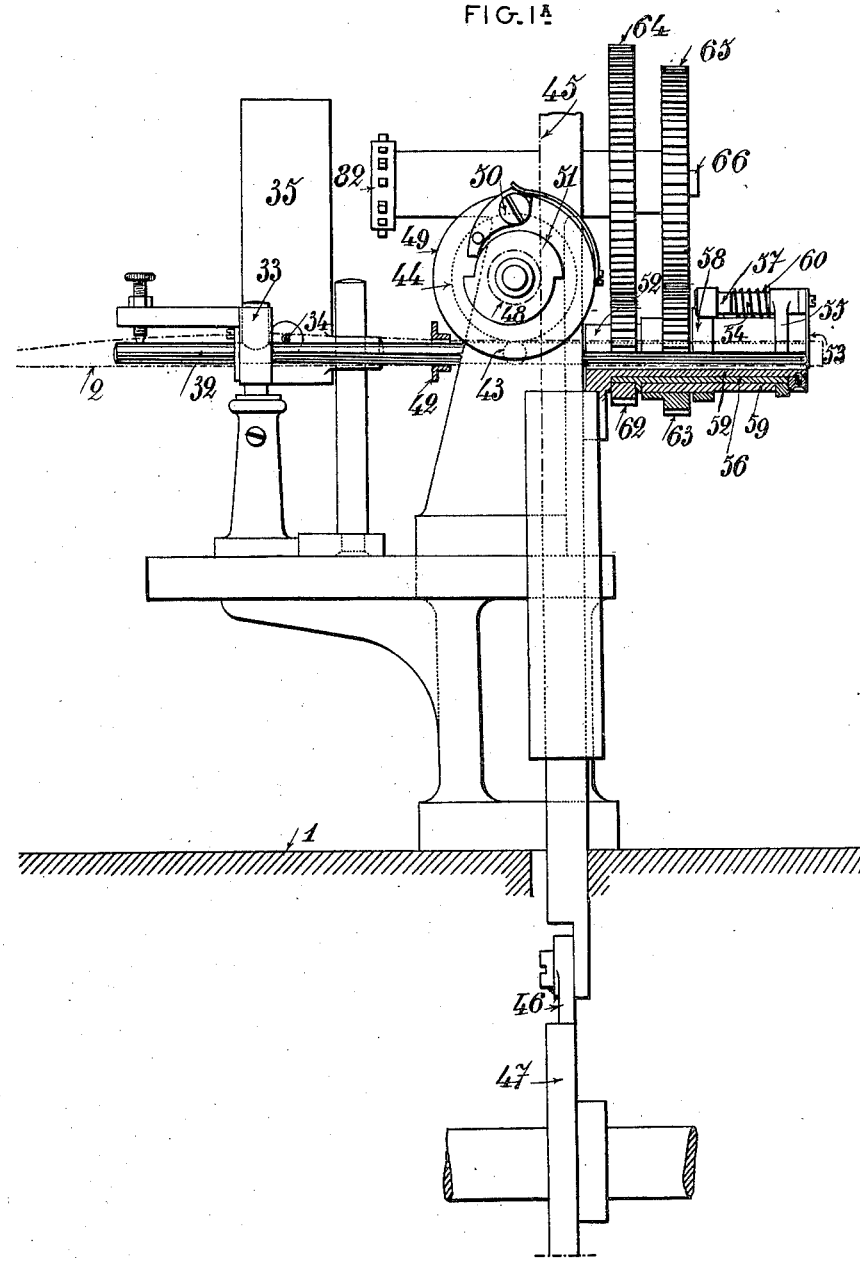

Witnesses
Paul Hunter
John Lotka

Inventors
Anatole Benoît
Julien Guéniffet
Jules Nicault

By Munn
Attorneys

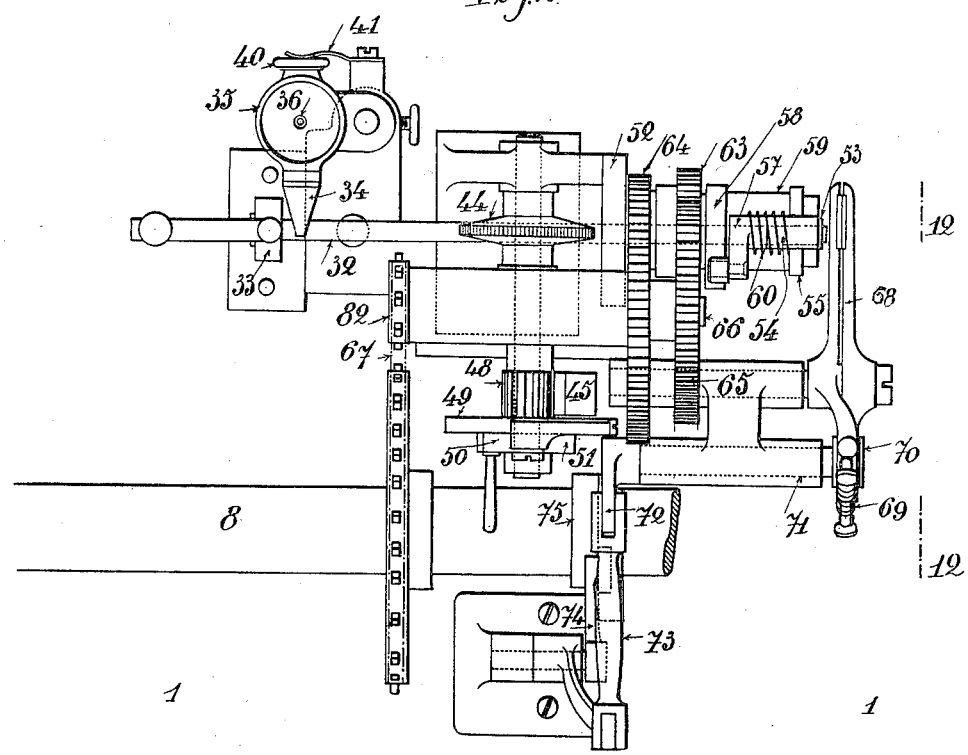

No. 678,636. Patented July 16, 1901.
A. BENOÎT, J. GUÉNIFFET & J. NICAULT.
MACHINE FOR MAKING PASTED TUBES FOR CIGARETTES.
(Application filed Jan. 14, 1901.)
(No Model.) 7 Sheets—Sheet 5.

Witnesses:
Paul Hunter
John Lotka

Inventors
Anatole Benoît
Julien Guéniffet
Jules Nicault
By Murray
Attorneys

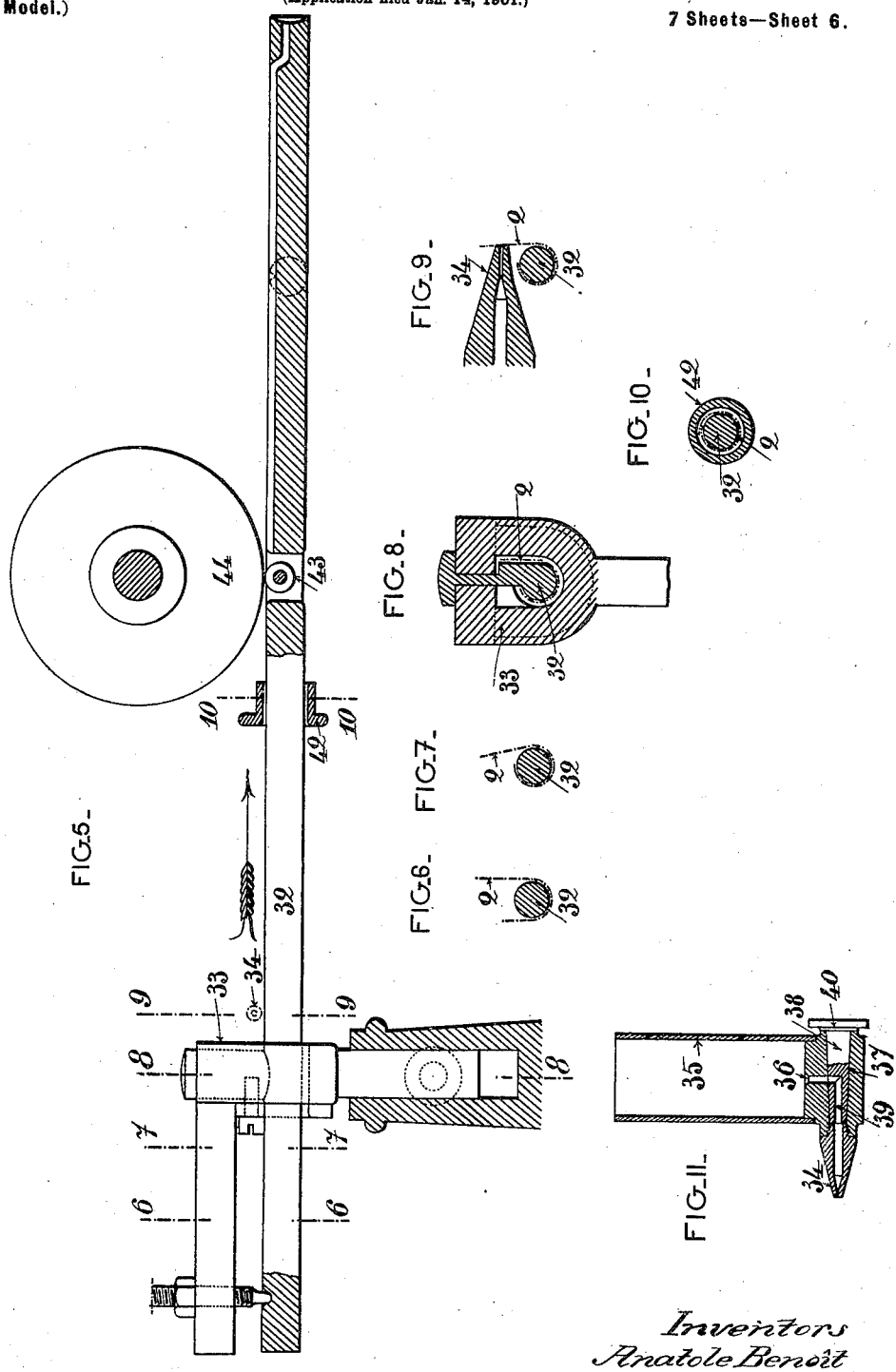

No. 678,636. Patented July 16, 1901.
A. BENOÎT, J. GUÉNIFFET & J. NICAULT.
MACHINE FOR MAKING PASTED TUBES FOR CIGARETTES.
(Application filed Jan. 14, 1901.)
(No Model.) 7 Sheets—Sheet 7.

UNITED STATES PATENT OFFICE.

ANATOLE BENOÎT, JULIEN GUÉNIFFET, AND JULES NICAULT, OF PARIS, FRANCE.

MACHINE FOR MAKING PASTED TUBES FOR CIGARETTES.

SPECIFICATION forming part of Letters Patent No. 678,636, dated July 16, 1901.

Application filed January 14, 1901. Serial No. 43,211. (No model.)

*To all whom it may concern:*

Be it known that we, ANATOLE BENOÎT, residing in Rue Daguerre, JULIEN GUÉNIFFET, residing in Rue Gassendé, and JULES NICAULT, residing in Rue Daguerre, Paris, France, citizens of the Republic of France, have invented certain new and useful Improvements in Machines for Making Pasted Tubes for Cigarettes, of which the following is a specification.

The improvements which form the subject-matter of the present invention relate to a machine for making cigarette-tubes which are pasted and closed at their ends.

The said improvements consist, notably, in the particular construction of a tube-forming device, of a paste-distributer, and of a tucking device, these devices being combined with each other so as to form a machine for producing a cigarette-tube which is pasted and closed at one end.

The accompanying drawings show one form of the invention.

Figure 2:
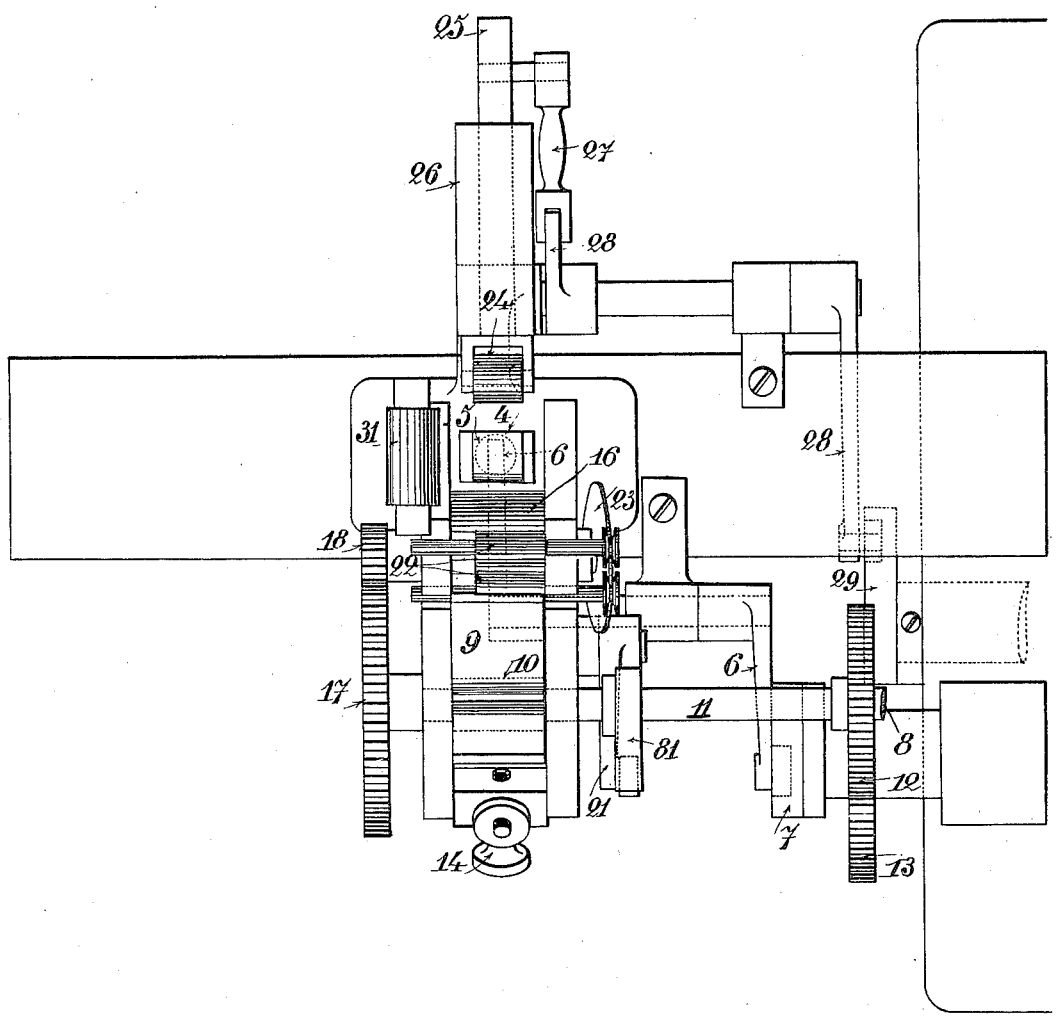
Figures 3, 4:
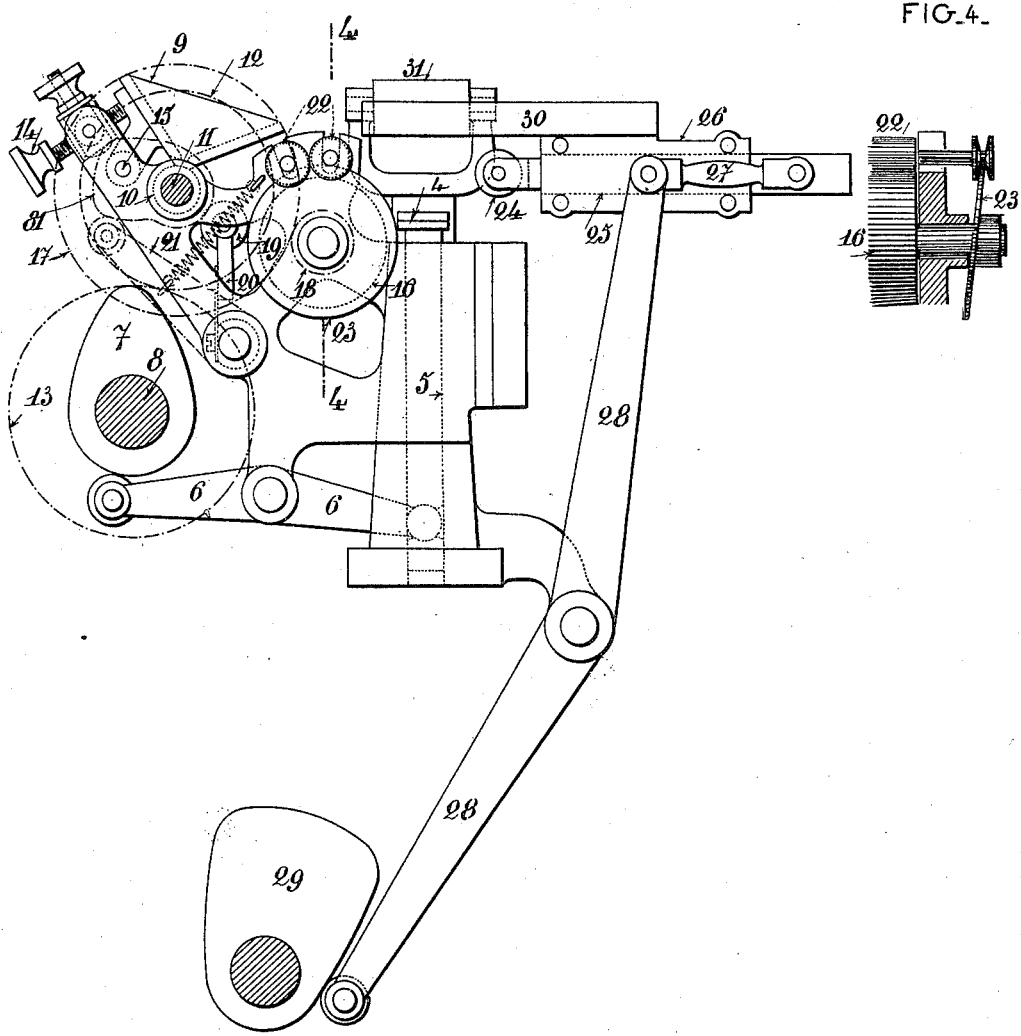
Figure 12:
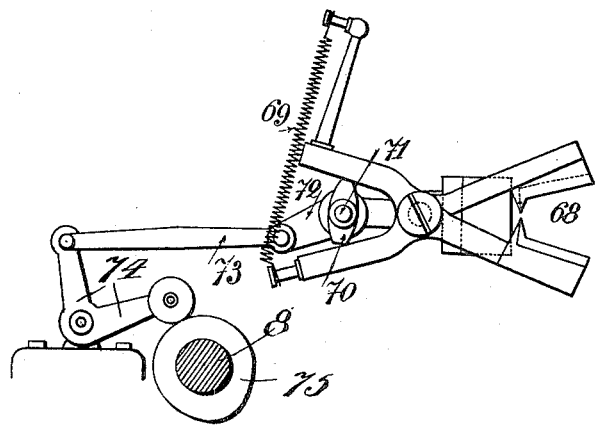
Figure 13:
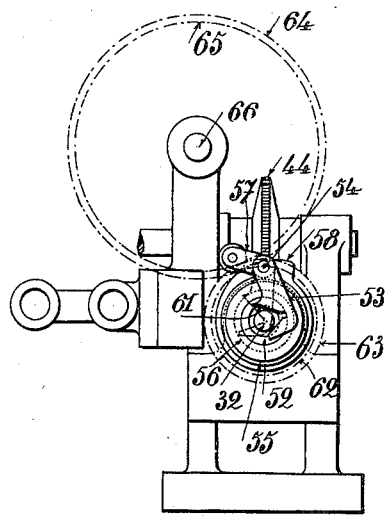

Figures 1 and 1ᵃ are an elevation of the machine. Figs. 2 and 2ᵃ are a plan, Figs. 1ᵃ and 2ᵃ being the right-hand continuations of Figs. 1 and 2, respectively. Fig. 3 is a view, partly in section, on the line 3 3 of Fig. 1, showing the stamp which forms an adjunct of our machine. Fig. 4 is a view of the inking-rollers, partly in section, on the line 4 4 of Fig. 3. Fig. 5 represents the spindle by means of which the paper tube is obtained. Figs. 6 to 10 are cross-sectional views on the lines 6 6, 7 7, 8 8, 9 9, and 10 10, respectively, of Fig. 5. Fig. 11 is a vertical section of the paste-distributing device. Fig. 12 is a vertical section on the line 12 12 of Fig. 2ᵃ, showing scissors for cutting the paper tube. Fig. 13 is a side view of the device for tucking or closing the end of the tube, the said device being shown also in Figs. 1ᵃ and 2ᵃ.

The improved machine comprises a main frame 1, which supports the several parts, which will be described successively in the order in which the paper advances.

The strip of paper 2, coming from a reel 3, passes first into a stamping device, (shown in Figs. 1 to 4,) which comprises a stamp 4, carried by a sliding rod 5, guided vertically and operated by means of a lever 6 and of a cam 7, fixed on the cam-shaft 8 to ink the said stamp. An ink-reservoir 9 is arranged above a roller 10, fixed on a spindle 11, which receives a continuous rotary movement from a pinion 12 in gear with a pinion 13, mounted on the shaft 8. The flow of the ink from the reservoir 9 and onto the roller 10 can be regulated by means of a screw 14, which serves to bring the reservoir nearer to the roller by causing the said reservoir to oscillate on a pivot 15. Parallel to the roller 10 is arranged another roller 16, turned by means of pinions 17 and 18, and receiving ink on its surface through the medium of a conveying-roller 19, mounted on a lever 20, operated by means of an arm 21, provided with a roller running on a cam 81, fixed on the aforesaid spindle 11. On the roller 16 rest two equalizing-rollers 22, which are slightly reciprocated longitudinally by a cam 23, mounted on the spindle of the roller 16, Fig. 4. Opposite to roller 16 is movably arranged a roller 24, carried by a rod 25, capable of movement in a horizontal slideway 26 and connected by a link 27 to an oscillating lever 28, operated by a cam 29. Above the stamp is arranged a fixed support 30, under which passes the paper strip 2, and which serves as the stamping-block during the stamping operation. The said support 30 is provided with a guide-roller 31 for the said strip 2. After leaving the stamping device the paper strip comes under a spindle 32, which serves to wind the paper longitudinally, to present one of its edges to the pasting device and then to bring the two edges together, and thus form a continuous tube. For this purpose the said spindle is supported by a sleeve 33, which gives the initial curve to the paper, as shown in Figs. 6, 7, and 8. Beyond the said sleeve the paper passes in front of the nozzle 34, screwed on the bottom of the paster. The latter consists of a receptacle 35, Fig. 11, in the bottom of which is an opening 36, in communication with a valve-casing 37, slightly conical and in which is arranged a plug 38, having an elbow-channel 39, serving to establish a communication between the opening 36 and the nozzle 34, the outlet of which is very small. The head 40 of the plug 38 can be turned by hand and held in its different positions by a spring 41, Fig. 2ª. The outflow of the paste can be easily regulated or even completely stopped. After being pasted the strip 2 passes through a fixed ring or thimble 42, which is concentric to the said spindle 32 and completes the winding of the paper, as shown in Fig. 10. Then the strip passes between two rollers 43 and 44, serving to move the paper onward and also to press together the pasted edges of the paper. The roller 43 is of small diameter and is housed in a mortise of the spindle. It is free to revolve on its axis. The other roller 44 has a circumference equal to double the length of a cigarette, and it is able to turn intermittently to the extent of half a revolution each time. This movement is obtained by means of a toothed rack 45, vertically guided and connected to a lever 46, operated by a cam 47. The said rack meshes with a pinion 48, loosely mounted on the spindle of the roller 44 and integral with a plate or disk 49, carrying a pawl 50. The spindle of the roller carries a ratchet-wheel 51, which has two teeth and can be revolved by the said pawl 50 in the direction required to bring forward the paper tube.

The outlet end of the spindle 32 is arranged within a fixed socket 52, on which revolve the members or parts of the tucker. The latter comprises a blade 53, fixed on a spindle 54, mounted in a bracket or collar 55, capable of revolving concentrically to the spindle 32 and which is integral with a socket 56, surrounding the fixed socket. The opposite end of spindle 54 is provided with a lever 57, operated by a cam 58, integral with a socket 59, loosely mounted on the said socket 56. A spiral spring 60, wound around the spindle 54, holds the lever 57 constantly in contact with the cam 58. By the action of the latter the blade 53 can thus oscillate in front of the end of the socket 52 between two positions. (Shown in dotted and full lines in Fig. 13.) In the part of the blade situated opposite the socket 52 is cut a notch 61, of triangular or other suitable shape, which serves to produce the tucking at the end of the paper tube.

The sockets 56 and 59 can turn simultaneously, but at different speeds. For that purpose they are provided with pinions 62 and 63, of suitable diameters, meshing, respectively, with the toothed wheels 64 and 65, mounted on a common shaft 66. The latter is given a continuous rotary movement by means of a sprocket-wheel 82 and sprocket-chain 67.

Beyond the tucking device are arranged the scissors 68, for cutting the paper tube at a very small distance from the plane of the blade 53. The branches of the scissors, which a spring 69 tends to close, are operated by means of an oscillating cam 70, fixed on a shaft 71, connected by a lever 72 and a link 73 to another lever 74, operated by a cam 75.

The operation of the machine thus constituted is as follows: Under the action of the roller 44, revolving intermittently, as hereinbefore described, the paper strip 2 is fed forward to the extent of predetermined lengths in the direction shown by the arrows in the drawings. During its passage above the stamp the latter is moved down, the inking-roller 24 supplies itself with ink from the rotary roller 16, and then returns in taking contact with the stamp and inking the same. The stamp is moved up by the action of the cam and comes into contact with the strip 2 at the time when the latter is stopped or arrested. It then moves down again, and the operation of the stamp is thus regularly repeated. When the strip passes in front of the pasting device, one of its edges slides into contact with the nose 34 and receives a thin and narrow stripe of paste, the width of which can be regulated by means of the key or plug 38. After its passage through the thimble 42 and between the rollers 43 and 44 the continuous tube is formed and penetrates into the socket 52. When the tube is moving, the relative position of the spindle 54 and of the cam 58 is such that the blade 53 is moved away, thus leaving free the opening in the socket 52. As soon as the tube stops the scissors 68 are closed and cut the same at a suitable distance from the socket 52, as shown in Fig. 1ª. Then the blade 53, oscillating under the action of the cam 58, comes near the axis of the tube and turns continuously around the same. The result is that the end of the tube is tucked in a regular manner, the said operation forming a suitably-closed end for the cigarette. The cam 58 then allows of the blade 53 moving away to let another portion of the tube come out of the socket 52. The said portion cut soon after by the scissors falls away from the remaining portion of the tube.

We reserve to ourselves the right of modifying the details of the forms and arrangements of the several constitutive parts of the improved machine, in so far as such modifications remain within the scope of the invention.

We claim—

1. A tube-forming machine, comprising a spindle, means for feeding a strip of paper lengthwise of said spindle and winding the paper around the spindle, and a tucker mounted to revolve around the axis of the spindle and also mounted to oscillate transversely of the spindle about an axis eccentric to the spindle's axis, and means for operating the tucker.

2. In a tube-forming machine, a tucking device serving to close one end of the paper tubes, provided with a suitably-notched blade capable of oscillating around a spindle or axis having a continuous rotary movement relatively to the tube, in combination with a cam also revolving, relatively to the tube, at a different speed, and serving to cause the said blade to oscillate, as hereinbefore described.

3. A machine for forming cigarette-wrappers into cylindrical shape, comprising a spindle, means for feeding a strip of paper lengthwise of said spindle and winding the paper around the spindle, a pasting device located adjacent to the farther or discharge end of the spindle, a tucker mounted to revolve around the axis of the spindle and also mounted to oscillate transversely of the spindle, about an axis eccentric to the spindle's axis, means for operating the tucker, and a device for cutting the paper at the tucked end.

4. In a tube-forming machine, a spindle adapted to form a support for the cylindrical casing or wrapper, a tucker mounted to revolve around the axis of the spindle and also mounted to oscillate transversely of the spindle, about an axis eccentric to the spindle's axis, means for operating the tucker, and a device for cutting the wrapper at the tucked end.

In testimony that we claim the foregoing as our invention we have signed our names in presence of two subscribing witnesses.

ANATOLE BENOÎT.
JULIEN GUÉNIFFET.
JULES NICAULT.

Witnesses:
CAMILLE BLÉTRY,
J. ALLISON BOWEN.